United States Patent [19]

Laguna

[11] Patent Number: 4,750,341

[45] Date of Patent: Jun. 14, 1988

[54] VEHICLE ANTI-THEFT DEVICE

[76] Inventor: Vinzi Laguna, 5617 W. Roscoe, Chicago, Ill. 60634

[21] Appl. No.: 57,946

[22] Filed: Jun. 4, 1987

[51] Int. Cl.$^4$ .............................................. B60R 25/02
[52] U.S. Cl. ......................................... 70/209; 70/226
[58] Field of Search ................. 70/209, 226, 225, 211, 70/212, 237

[56] References Cited

U.S. PATENT DOCUMENTS

| 1,347,463 | 7/1920 | Jameson | 70/209 |
| 1,364,068 | 1/1921 | Brader | 70/212 |
| 3,815,391 | 6/1974 | Latta | 70/209 |

FOREIGN PATENT DOCUMENTS 366423 12/1938 Italy ....................................... 70/212

*Primary Examiner*—Robert L. Wolfe
*Attorney, Agent, or Firm*—Balogh, Osann, Kramer, Dvorak, Genova & Traub

[57] ABSTRACT

A vehicle anti-theft device attachable to a steering wheel. The device is in the form of a wheel-like member having an inner disposed bight defining a space for admitting a rim of the steering wheel, the open portion of the bight having at least one pair of opposed slots for admitting a free end of a lock bar which is lockable by a lock. The device extends the size of the steering wheel along the radial and tangential directions, thereby increasing the size of the steering wheel, which will encounter obstacles with respect to the vehicle structure and the occupant attempting to rotate the steering wheel. In one embodiment, the device includes an elongated bight member having two pairs of opposed slots which are traversed by a U-shaped saddle member passing through the slots and defining a locking space about the rim of the wheel. A lock is associated with the saddle member for maintaining the saddle member in an engaged position with the bight member.

10 Claims, 1 Drawing Sheet

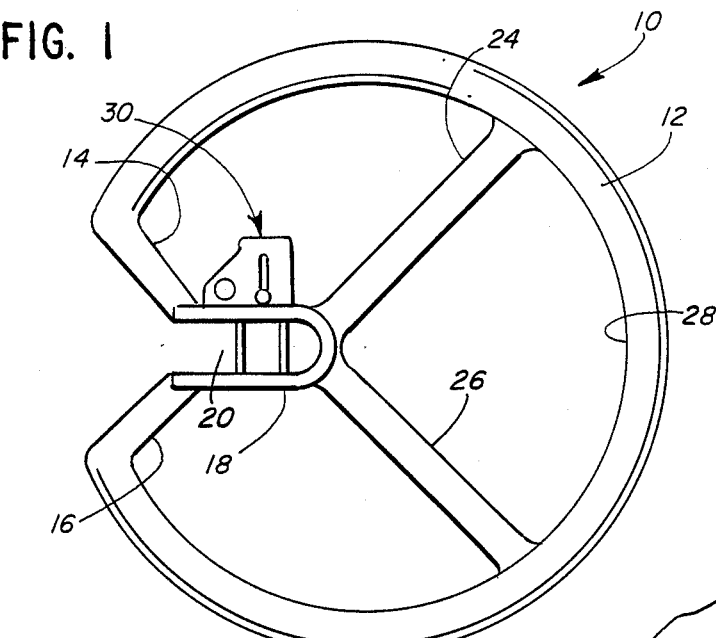
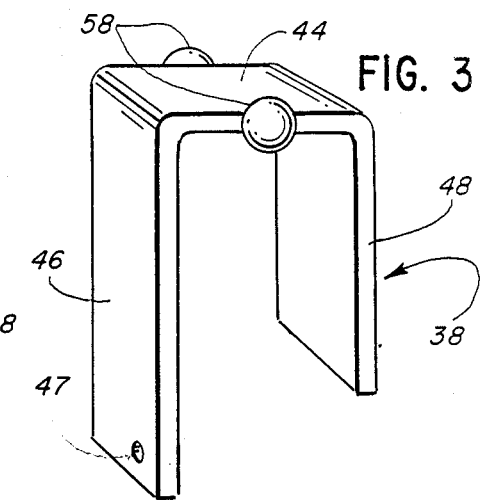
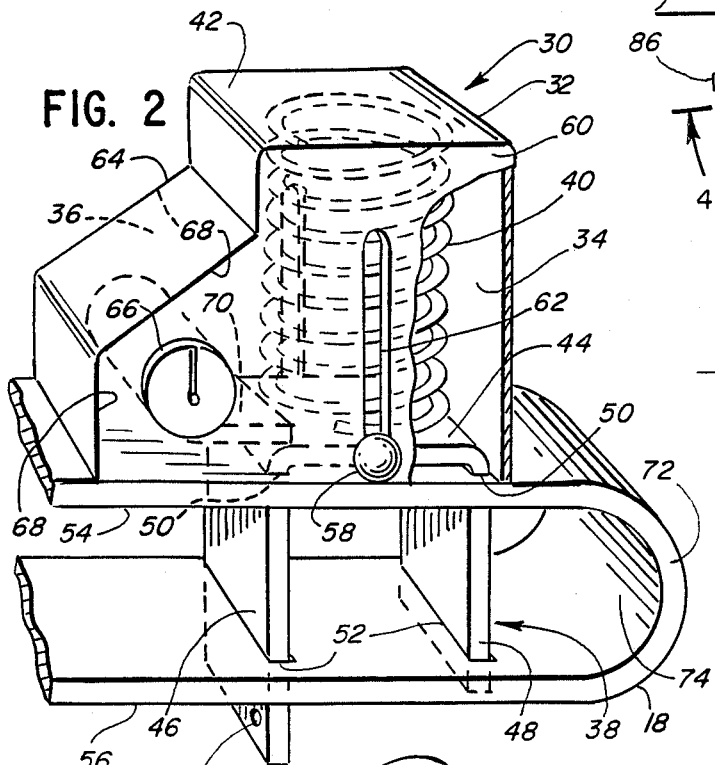
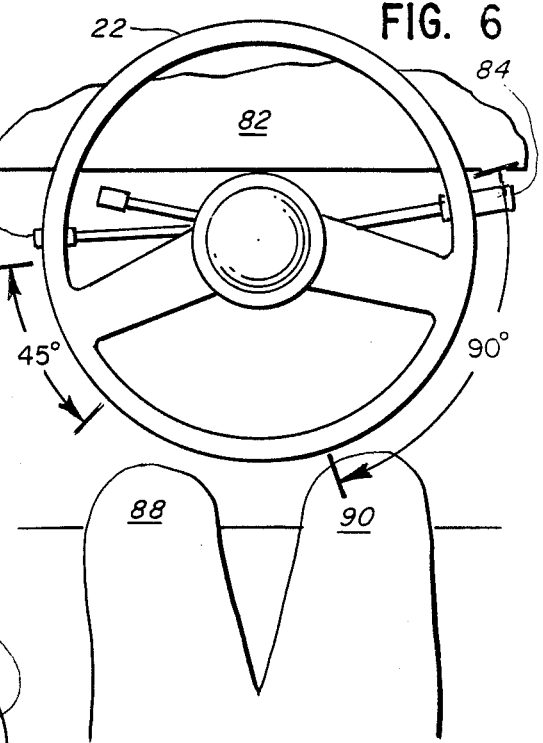
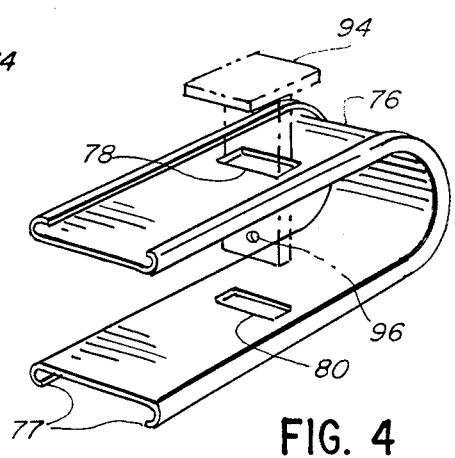

VEHICLE ANTI-THEFT DEVICE

BACKGROUND OF THE INVENTION

1. Field of the Invention

This invention is primarily concerned with anti-theft devices, and more particularly to an anti-theft device adapted for mounting on a steering wheel of a vehicle and limiting the rotation of the steering wheel and consequently the maneuverability of the vehicle.

2. Description of the Prior Art

Most of the automobiles available on the market today are provided with an anti-theft device incorporated in the steering column of the automobile, such device preventing the operation of the steering wheel.

Another form of anti-theft device presently available is an elongated member which is clamped to the steering wheel and the other end of the member is attached to the floor or to some other portion of the automobile to limit the rotation of the steering wheel.

Although the use of an anti-theft device incorporated in the steering column of an automobile is excellent, it is not universally available in all of the automobiles being built over the entire world. Also, there are many vehicles besides automobiles which are not provided with any anti-theft protection.

As for the use of an elongated member for restricting the rotation of a steering wheel by attaching the member to another portion of the vehicle, this requires modification of the vehicle. For example, if the member is to be attached to the floor, this requires appropriate installation time and cost.

SUMMARY OF THE INVENTION

To overcome the disadvantages of the anti-theft devices presently available on the market and to provide devices for any type of vehicle utilizing a steering wheel, the present invention comprises an anti-theft device which can be readily attached to the steering wheel of a vehicle and subsequently locked, whereby the device possesses a configuration which substantially limits the rotation of the steering wheel. The configuration of the device is such that it obtrudes on various portions of the vehicle, including the body of the vehicle thief.

It is the object of the invention to provide a vehicle anti-theft device that can be readily attached to a steering wheel and then locked by appropriate means to prevent the removal of the device from the steering wheel.

It is an object of the invention to provide an anti-theft device for attachment to the steering wheel of the vehicle for the purpose of impairing the maneuverability and control of the vehicle.

It is a further object of the invention to provide an anti-theft device attachable to a steering wheel of a vehicle, said device having a configuration which is quite visible to alert a would-be vehicle thief of the anti-theft deterrent installed in the vehicle.

A still further object of the invention is to provide an anti-theft device which is attachable only to the steering wheel of the vehicle, without requiring any particular installation in the vehicle.

The invention will now be described with reference to the accompanying drawings.

BRIEF DESCRIPTION OF THE DRAWINGS

FIG. 1 is a plan view of a vehicle anti-theft device;

FIG. 2 is an enlarged partial view of a lock mechanism integrally associated with the anti-theft device;

FIG. 3 is an enlarged view of a saddle of the lock mechanism shown in FIG. 2;

FIG. 4 shows a liner for use with the anti-theft device when attached to an unpadded steering wheel;

FIG. 5 illustrates the installation of the antitheft device on a steering wheel of a vehicle; and FIG. 6 is a diagrammatic illustration of how the anti-theft device limits the rotation of the vehicle steering wheel in relationship to the body of the thief and the various vehicle components in close proximity to the steering wheel.

DESCRIPTION OF THE PREFERRED EMBODIMENT

Referring to FIG. 1, a vehicle anti-theft device 10 having a general configuration quite similar to a steering wheel and having a peripheral member 12 forming an incomplete circle having angled ends 14 and 16 attached to a bight member 18 defining a U-shaped channel 20 which is adapted to receive a portion of a steering wheel 22 as shown in FIG. 5.

In the present embodiment, the peripheral member 12 is a metallic tube having the angled ends 14 and 16 appropriately fastened, as by welding, to the bight member 18 made of metal. The anti-theft device also includes at least two spokes 24 and 26 which extend from the inner surface 28 of the member 12 and terminate in a securement with the bight member 18. The spokes 24 and 26 can similarly be tubular in nature and made of metal welded to the peripheral member 12 and the bight member 18.

The anti-theft device 10 is provided with a lock mechanism 30 secured on the bight member 18. As best viewed in FIG. 2, the lock mechanism 30 comprises a housing 32 having a rectangular chamber 34 and a semi-trapezoidal chamber 36. The lock mechanism 30 is securely attached, as by welding, to the bight member 18. The rectangular chamber 34 contains a saddle member 38 constantly under the bias of a spring 40 which is positioned between the top 42 of the housing 30 and the bight portion 44 of the saddle member 38.

The saddle member 38, as shwon in FIG. 3, has the bight portion 44 terminating in a pair of spaced legs 46 and 48 which are adapted to traverse slots 50 and 52 in legs 54 and 56, respectively, of the bight member 18.

Referring again to FIG. 3 in particular, the bight portion 44 of the saddle member 38 is provided with a pair of finger holds 58 firmly secured on both sides of the bight portion 44. The finger holds 58 are preferably welded to the bight portion 44 in such manner that they extend away from the edges of the bight portion 44.

The portion of the housing 32 defining the rectangular chamber 34 is provided with a pair of spaced walls 60, each of which is provided with an elongated slot 62. The slots 62 define paths accommodating the movement of the saddle member 38 with its spaced finger holds 58. The slots 62 are open at one end thereof for the purpose of receiving the finger holds 58 exteriorly of the housing 32.

A portion 64 of the housing 32 defining the semi-trapezoidal chamber 36 contains a lock 66 extending between spaced walls 68 of the housing portion 64. The lock 66 is the upward movement of the saddle member 38 when the lock 66 is operated with a key (not shown) into the locked position, as shown in FIG. 2. The tang 70 abuts the bight portion 44 of the saddle member 38, thereby preventing the movement of the saddle member 38 in an upward direction against the bias of the spring 40. The bight member 18 has a bight 72 which, in conjunction with the leg 48 of the saddle member 38, defines a locking area 74 for receiving a portion of the steering wheel 22.

As previously mentioned, the bight member 18 is made from metal, such as steel, the legs 54 and 56 being spaced widely enough to accept a padded steering wheel. Since the wheel is padded, no damage, such as scratching, can accur on the steering wheel. However, if the wheel is not padded, it is advisable to use a liner 76 as shown in FIG. 4. The liner 76 is made from a material such as plastic, which would not cause any damage to the unpadded steering wheel. The liner 76 is fitted between the legs 54 and 56 of the bight member 18 and retained therein by rims 77. The liner 76 is provided with slots 78 and 80 which line up, respectively, with slots 50 and 52 in the legs 54 and 56. Therefore, the slots 78 and 80 provide freedom of movement for the legs 46 and 48 of the saddle member 38.

When the anti-theft device 10 is attached to the steering wheel 22, it limits the rotational capability of the steering wheel because of obstructions formed by components of the vehicle as well as the body of the driver. Reference is made to FIG. 6 which illustrates diagrammatically the relationship of the various components of the vehicle and the position of the driver. In the vehicle, a dashboard 82 acts as an obstacle to limit the movement of the steering wheel 22 when the anti-theft device 10 reaches and abuts the dashboard 82. A gearshift lever 84 limits additionally the rotatability of the steering wheel 22. A turn signal lever 86 limits the rotatability of the steering wheel 22 on the left side of the vehicle. Also, knees 88 and 90 of the driver form additional obstructions to the free movement of rotatability of the steering wheel 22. As shown in FIG. 6, the angular designations show limited rotatable motions of the steering wheel 22.

Although the preferred embodiment of the present invention has been described as being made from metal, such as steel, it is apparent that other materials may be used. For example, the anti-theft device can be formed by a molding practice, and the device can be made from a high-impact plastic. Furthermore, although the preferred configuration of the anti-theft device is shown as being circular, it is obvious that other configurations may be used provided, however, that they extend below the periphery of the steering wheel and present an impediment to the free rotational movement of the steering wheel.

The lock 66 is schematically shown to indicate the manner of securing the saddle member when the anti-theft device 10 is attached to the steering wheel 22. Any form of a lock commercially available can be readily adapted to provide locking of the anti-theft device on the steering wheel.

As shown in FIG. 5, the anti-theft device 10 acts to extend the size of the steering wheel 22 in two directions, in a radial direction as indicated by an arrow B and tangentially along an axis designated by an arrow A, which axis is parallel to the axis C of the steering column 92. From this illustration, it is quite apparent that the most effective component of the impediment extends along the direction A. Therefore, it is quite possible to have a configuration of an anti-theft device in the form of a tangential linear extension means standing along the direction the arrow A and attached to the steering wheel 22.

As an alternative to the lock mechanism 30, which incorporates a saddle member 38 within its housing 32, the lock mechanism can be entirely left out and only the saddle member 38 could be used for insertion through the slots 50 and 52 in the bight member 18. One of the legs, such as 46 in the saddle member 38, can be made a little longer, as shown in phantom, so that it extends on the other side of the leg 56 of the bight member 18. The longer leg can be provided with a hole 47 which can receive the shackle of a pad lock or a combination lock.

Instead of using saddle member 38, use a T-bar 94 which will pass through both slots 50 and 52. The T-bar 94 is shown in phantom in FIG. 4 in relationship to the liner 76. The T-bar has a hole 96 for admitting a shackle on a lock (not shown). This arrangement requires only one pair of opposed slots instead of two pairs of slots as shown in FIG. 2.

What is claimed is:

1. A vehicle anti-theft device attachable to a steering wheel, comprising a wheel-like member having a peripheral member terminating in a bight member inwardly directed of said wheel-like member, at least two members connecting said inwardly directed bight member to an inner periphery of said wheel-like member, a lock mechanism secured to one leg of said bight member, said lock mechanism having a movable member, at least one slot transversely extending in one leg of said bight member, said movable member slidably positioned in said slot for movement in and out of said bight member, at least one fingerhold on said movable member for manually moving said movable member, and means for locking said movable member when extending into said bight member, said movable member having a portion in the extended position, defining a locking area with respect to a bight of said bight member for receiving and clamping a portion of the steering wheel.

2. The device according to claim 1, wherein said bight member has a further leg provided with a transverse slot, directly opposite to the slot in said one leg, and said movable member engages both of said slots when in extended position.

3. The device according to claim 1, wherein said lock mechanism includes a housing, said movable member being cooperatively positioned in said housing via said slot, and a spring in said housing biasing said movable member out of said housing into said bight member.

4. The device according to claim 1, wherein said lock mechanism includes a housing, said movable member being a saddle member located in said housing and having a pair of spaced legs connected by a bight, said bight member having a pair of spaced legs, each provided with a pair of spaced transverse slots, the slots in each leg coinciding with the slots in the other leg, the legs of said saddle member always being in engagement with the slots in one of the legs of said bight member when in open position and in full engagement with all of said slots when moved into said bight member.

5. The device according to claim 4, including a spring in said housing biasing said saddle member out of said housing into said bight member.

6. The device according to claim 1, including a liner for insertion into said bight member, said liner having a transverse slot aligned with the slot on said one leg of said bight member.

7. The device according to claim 4, including a liner insertable into said bight member, said liner having a pair of spaced legs coupled by a bight, each leg having a pair of spaced transverse slots, the slots in each leg aligned with the slots in the other leg, the liner slots being aligned with the respective slots in the legs of the bight member.

8. The device according to claim 4, wherein said housing includes a pair of spaced opposite walls provided with coincident spaced slots, the edges of said bight on said saddle member being provided with oppositely-spaced fingerholds protruding outwardly through said slots to permit manual movement of said saddle member in and out of said housing.

9. A vehicle anti-theft device attachable to a rim of a steering wheel in a vehicle, comprising linear extension means extending tangentially and downwardly from the rim, a steering wheel rim clamping means on said linear extension means, a lock mechanism on said clamping means for lockably securing said linear extension means, said linear extension means having a body adapted to extend downwardly from the rim of the steering wheel along an axis substantially parallel to the longitudinal axis of a steering column supporting said steering wheel, whereby the rotative freedom of the steering wheel is substantially limited by said linear extension means encountering structural obstacles in the vehicle.

10. A vehicle anti-theft device according to claim 9, wherein said clamping means comprises a pair of spaced legs provided with a pair of opposed slots, and a T-bar having a free end passing through both of said slots to define a locking space about the rim of the steering wheel, the free end of said T-bar being provided with means for accepting a lock.

* * * * *